J. R. GAMMETER.
TIRE CALIPERS.
APPLICATION FILED SEPT. 9, 1914.
1,245,213.
Patented Nov. 6, 1917.
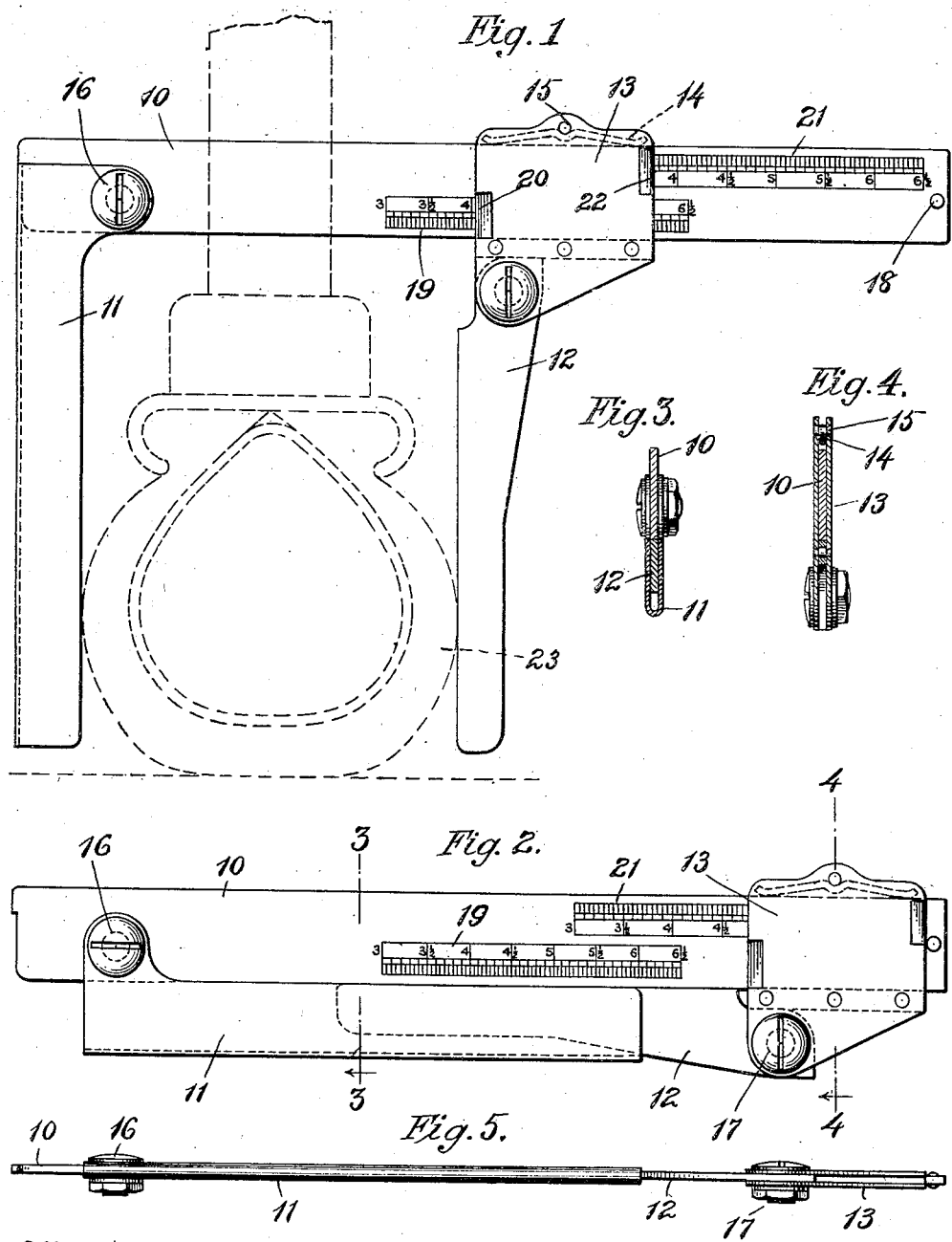

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

TIRE-CALIPERS.

1,245,213.  Specification of Letters Patent.  Patented Nov. 6, 1917.

Application filed September 8, 1914. Serial No. 860,646.

*To all whom it may concern:*

Be it known that I, JOHN R. GAMMETER, a citizen of the United States, residing at Akron, in the county of Summit and State of Ohio, have invented certain new and useful Improvements in Tire-Calipers, of which the following is a specification.

The object of this invention is to provide a tire caliper containing within itself the means for determining the proper degree of inflation of the tire for the particular load which it is sustaining by comparing the width of said tire at a normal or undistorted point with its width on the ground.

To this end I have devised a caliper having relatively-adjustable arms and provided with measuring portions which correspond respectively to the distorted and undistorted width for the several tire sizes, and which differ by an amount representing a predetermined percentage of deflection for each width.

In the particular embodiment selected herein to illustrate my invention, the caliper has a pair of arms, one of which slides along a bar toward and from the other, and on the bar are marked two scales whose correspondingly-designated units, representing respectively the undistorted and the distorted widths for the several tire sizes, constitute the "measuring portions" above referred to and differ in position with relation to the slide by the said predetermined percentage.

Of the accompanying drawings, Figure 1 represents a side elevation of a tire caliper constructed according to my invention and applied to the deflected portion of a pneumatic tire.

Fig. 2 represents a side elevation showing the instrument in its folded condition.

Figs. 3 and 4 represent transverse sections on the lines 3—3 and 4—4 of Fig. 2.

Fig. 5 represents a reverse plan or edge view.

In the drawings, 10 is the scale bar of the caliper, 11 is the fixed arm operatively positioned at right-angles thereto, and 12 is the movable arm parallel to the arm 11 and mounted on a slide 13 which is provided with a spring friction plate 14 retained by a pin 15. While the arms 11 and 12 might be permanently located at right-angles to the scale bar, it is preferred to hinge them so as to fold the instrument in a smaller compass when not in use. The arm 11 is pivoted at 16 and formed of sheet metal bent over or doubled so as to overlap, and as here shown to partially sheath the arm 12 when the two are folded parallel to the scale bar as represented in Fig. 2, arm 12 being pivoted to the slide at 17 and both arms having suitable stops to prevent their turning beyond the right-angled position. 18 is a stop pin to limit the outward movement of the slide.

19 is a scale marked on the bar 10 and having units corresponding to a recognized standard of measurement such as inches and fractions, said scale including the ordinary range of sections of pneumatic tires in common use. The divisions of this scale are read from the left-hand edge 20 of slide 13 and represent the distance in inches between the proximate edges of the arms 11 and 12.

21 is a second scale marked on the bar 10 above the scale 19 and in this instance read from the opposite edge 22 of the slide, although it would obviously be possible to have this scale shifted leftward by the width of the slide and read from the same edge 20 as the scale 19.

The units of this second scale exceed in length the units of the standard scale 19 by a predetermined amount, for example 9%, which is an arbitrary figure representing the experience of the tire manufacturer as to the amount of lateral distortion which is allowable without causing damage to the tire in running, and beyond which the tire is regarded as underinflated.

In operating my invention, the user employs the caliper to determine the normal transverse diameter of his tire 23 by applying the instrument thereto at a point on the tire away from the ground, and then, having observed this measurement by reading the scale 19 from the left-hand edge 20 of the slide, he moves the slide to the right until its right-hand edge reaches a division indicating the same measurement on the scale 21, and applies the caliper to the tire at its point of maximum deflection adjacent to the ground as represented in Fig. 1. This view shows the deflection reading for a 3½" tire. If the transverse diameter of the tire at this point does not exceed the distance between the caliper arms 11 and 12, the user then knows that the amount of deflection is within the allowable percentage, but if said diameter exceeds the distance between the arms, this indicates that the tire is under-inflated for the load which it sustains and should be pumped up. If the diameter is less than this distance the tire is over-inflated for the particular load, and some of the air can be released.

My invention provides a more reliable mode of determining the proper degree of inflation than the usual method which consists in using a pressure gage, inasmuch as such gages often fail correctly to indicate the pressure within the tire, and are more troublesome to apply, and for the further reason that the amount of deflection represents the relation of the air pressure to the actual load sustained by the tire at the time.

The invention may be embodied in various forms of calipers other than the particular form shown, and is not limited to the exact details of construction herein represented. For example the corresponding divisions on the two scales need not be marked in inches or fractions but may have pairs of designations of any suitable character. The percentage of allowable deflection does not have to be the same for the different tire sizes.

As I believe myself to be the first to provide a tire caliper containing within itself the means for determining the proper or any predetermined degree of tire deflection, I do not desire to be limited to the exact form or arrangement of measuring portions described, so long as said portions, whatever their form, are related by fixed percentages for the purpose described, and adapted to give the results above set forth.

I claim:

1. A pneumatic tire caliper adapted to embrace the tire casing in planes transverse to the plane of the wheel, for comparing the normal diameter of said casing with its diameter as distorted under load, said caliper having measuring portions representing respectively the normal diameter for a given size of tire, and the predetermined safe distorted diameter for that size.

2. A pneumatic tire caliper comprising a pair of arms movable to adjust the distance between them, for embracing the tire casing in planes transverse to the plane of the wheel, said caliper having measuring means for comparing the distorted and undistorted widths of tires of different sizes, the said means including measuring portions for each size representing respectively the normal diameter and the predetermined safe distorted diameter for that size.

3. A tire caliper having relatively-movable members to engage opposite points on the sides of the tire, and a part coöperating with said members and having a scale for indicating the distance between said members at a normal or undistorted point on the tire, and a second scale whose units differ from those of the first-said scale by an amount representing a predetermined safe percentage of distortion for each width of tire.

4. A tire caliper comprising a bar, a pair of arms adapted to engage opposite points on the sides of the tire, one of said arms being hinged at a fixed point on the bar, the other being hinged on a slide movable along the bar toward and from the first-said arm, the said arms being foldable substantially parallel with the bar and adapted to overlap in their folded position, the caliper having measuring portions corresponding respectively to the undistorted and the distorted widths of the several sizes of tires within its range and related by a predetermined safe percentage of distortion for each tire width.

5. A pneumatic tire caliper whose arms are adapted to embrace the tire cross-wise thereof, said caliper having measuring portions representing respectively the normal diameter for a given size of tire and a load-distorted diameter for that size, substantially nine per cent. greater than said normal diameter.

6. A pneumatic tire caliper comprising a pair of arms adapted to embrace between them the width of the tire and relatively adjustable to measure tires of different widths, said caliper having measuring portions representing respectively the normal diameters of the several tire sizes, and the load-distorted diameters for said sizes, differing by substantially nine per cent. from said normal diameters.

7. A pneumatic tire caliper comprising a bar with a pair of arms projecting at right-angles thereto, one of said arms being mounted on a slide adjustable toward and from the other arm, said bar being marked with two scales of linear measure, the units of one of which exceed those of the other by substantially nine per cent.

In testimony whereof I have hereunto set my hand in the presence of two subscribing witnesses, this 31st day of August, 1914.

JOHN R. GAMMETER.

Witnesses:
WALTER C. MEANS,
ILLA N. KIRN.